US010998803B2

(12) United States Patent
Sanders et al.

(10) Patent No.: US 10,998,803 B2
(45) Date of Patent: May 4, 2021

(54) HOMOPOLAR MOTOR FOR A FLYWHEEL ENERGY STORAGE SYSTEM

(71) Applicant: Amber Kinetics, Inc., Union City, CA (US)

(72) Inventors: Seth R. Sanders, Berkeley, CA (US); Mike M. He, San Jose, CA (US)

(*) Notice: Subject to any disclaimer, the term of this patent is extended or adjusted under 35 U.S.C. 154(b) by 419 days.

(21) Appl. No.: 15/637,985

(22) Filed: Jun. 29, 2017

(65) Prior Publication Data

US 2018/0006539 A1  Jan. 4, 2018

Related U.S. Application Data

(60) Provisional application No. 62/356,773, filed on Jun. 30, 2016.

(51) Int. Cl.
| | |
|---|---|
| *H02K 19/18* | (2006.01) |
| *H02K 19/12* | (2006.01) |
| *H02K 3/28* | (2006.01) |
| *H02K 1/12* | (2006.01) |
| *H02K 31/02* | (2006.01) |
| *H02K 7/02* | (2006.01) |
| *H02K 19/10* | (2006.01) |

(Continued)

(52) U.S. Cl.
CPC .............. *H02K 19/18* (2013.01); *H02K 1/12* (2013.01); *H02K 1/148* (2013.01); *H02K 3/28* (2013.01); *H02K 7/025* (2013.01); *H02K 7/09* (2013.01); *H02K 19/106* (2013.01); *H02K 19/12* (2013.01); *H02K 31/02* (2013.01); *F16C 2361/55* (2013.01); *F16F 15/30* (2013.01); *H02K 2213/06* (2013.01); *Y02E 60/16* (2013.01)

(58) Field of Classification Search
CPC ............ H02K 19/18; H02K 1/12; H02K 3/28; H02K 7/025; H02K 19/12; H02K 31/02
See application file for complete search history.

(56) References Cited

U.S. PATENT DOCUMENTS

| | | | |
|---|---|---|---|
| 4,000,452 A | 12/1976 | Heine | |
| 5,952,756 A * | 9/1999 | Hsu | H02K 15/03 310/112 |

(Continued)

OTHER PUBLICATIONS

PCT Invitation to Pay Additional Fees and, Where Applicable, Protest Fee, PCT/US17/40043, dated Aug. 31, 2017, 2 Pages.

(Continued)

*Primary Examiner* — Bernard Rojas
(74) *Attorney, Agent, or Firm* — Soquel Group LLC

(57) ABSTRACT

Embodiments of the subject invention are directed to a homopolar motor and its mechanical coupling with a flywheel rotor. The homopolar motor includes a rotor and no additional bearings, shafts, gears, pulleys, etc., are required to couple the flywheel rotor and the rotor of the homopolar motor. The homopolar motor includes a stator with a stator laminate and a number of stator pole pieces. The pole pieces generate magnetic flux across a first radial gap to rotor assembly to generate torque. Rotor assembly is coupled to and rotates with shaft which in turn rotates the flywheel rotor. The rotor assembly includes a rotor laminate stack and a field coupler. The field coupler has a top portion that rotates with the shaft and a bottom portion that attaches to a housing and remains stationary.

8 Claims, 4 Drawing Sheets

(51) Int. Cl.
  *H02K 1/14* (2006.01)
  *H02K 7/09* (2006.01)
  *F16F 15/30* (2006.01)

(56) References Cited

U.S. PATENT DOCUMENTS

| | | | | |
|---|---|---|---|---|
| 6,066,908 | A * | 5/2000 | Woodward, Jr. | H02K 1/06 310/216.045 |
| 6,822,361 | B1 * | 11/2004 | Roschin | H02K 31/00 310/114 |
| 6,933,643 | B1 * | 8/2005 | Heine | F16C 17/10 310/90 |
| 2001/0013734 | A1 | 8/2001 | Kanebako et al. | |
| 2007/0132331 | A1 | 6/2007 | Kerlin | |
| 2012/0223600 | A1 * | 9/2012 | Tonogi | H02K 1/148 310/46 |
| 2014/0084756 | A1 * | 3/2014 | Kalev | H02K 7/025 310/67 R |
| 2014/0319935 | A1 * | 10/2014 | Lin | H02K 1/06 310/12.24 |
| 2015/0318758 | A1 * | 11/2015 | Kalev | H02K 7/025 310/74 |
| 2016/0061289 | A1 | 3/2016 | Sanders et al. | |
| 2017/0264176 | A1 * | 9/2017 | Bernot | H02K 21/14 |

OTHER PUBLICATIONS

PCT International Search Report and Written Opinion for PCT/US17/40043, dated Nov. 8, 2017, 17 Pages.

Severson, E., et al., "Dual purpose no voltage winding design for the bearingless ac homopolar and consequent pole motors," IEEE Transactions on Industry Applications, 12 pages, vol. 51, Is. 4, Publication [online]. Jul.-Aug. 2015 [retrieved Aug. 28, 2017]. Retrieved from the Internet: <URL:http://ieeexplore.ieee.org/document/7004847/.

* cited by examiner

HOMOPOLAR MOTOR FOR A FLYWHEEL ENERGY STORAGE SYSTEM

CROSS REFERENCE TO RELATED APPLICATIONS

This application claims the benefit of priority under 35 USC 119(e) to U.S. Provisional Application No. 62/356,773, filed on Jun. 30, 2016 which is incorporated herein by reference in its entirety for all purposes.

TECHNICAL FIELD

The invention concerns a key component of a flywheel energy storage system, a device that functions as a motor and a generator, referred to herein as a homopolar motor.

BACKGROUND

Description of the Related Art

A flywheel energy storage system stores kinetic energy in a flywheel rotor. Kinetic energy is transferred to or stored in the rotor by accelerating the angular rotation velocity of the rotor. And, vice versa, energy is extracted from the rotor by decelerating the rotor.

Thus, it is with respect to these considerations and others that the present invention has been made.

SUMMARY

Embodiments of the subject invention are directed to a homopolar motor and its mechanical coupling with a flywheel rotor. The homopolar motor includes a rotor and no additional bearings, shafts, gears, pulleys, etc., are required to couple the the flywheel rotor and the rotor of the homopolar motor.

The homopolar motor includes a stator with a stator laminate and a number of stator pole pieces. The pole pieces generate magnetic flux across a first radial gap to the rotor assembly to generate torque. The rotor assembly is coupled to and rotates with shaft which in turn rotates the flywheel rotor. The rotor assembly includes a rotor laminate stack and a field coupler. The field coupler has a top portion that rotates with the shaft and a bottom portion that attaches to a housing and remains stationary. The stationary bottom portion of the field coupler is magnetically coupled to the stator by a low reluctance magnetic path. This low reluctance magnetic path may be constituted of solid steel, or other magnetically permeable material. Further, this low reluctance path may be incorporated within the homopolar motor housing, the overall flywheel housing, or any combination.

The homopolar motor further includes a field winding that generates magnetic flux across the gaps between the two interleaved portions of the field coupler. The gap formed by the interleaved portions of the field coupler are referred to as a second, or auxiliary, gap.

In certain embodiments the homopolar motor has a p-pole design for the rotor and stator elements. In one embodiment, the rotor laminate has with 4 lobes and 8 poles and the stator has 12 teeth and 12 slots. In certain embodiments, each tooth is implemented as a pole piece and a slot is formed by the space between two adjacent pole pieces. Each pole piece forms a sector of stator and each pole piece is formed by installing a winding, or coil, around a laminate sector of the stator.

In certain embodiments, the cross-section of the top portion of the field coupler appears as one, two, or more successive isosceles trapezoids that narrow from top to bottom. The cross section of bottom portion of the field coupler is inverted from that of top field coupler, i.e. it appears as one, two, or more successive trapezoids of the same size, which narrow from bottom to top. Further, there is a uniform, second, gap between the surfaces of the top portion and the bottom portion of the field coupler. The sloped surfaces of the field coupler and the resulting gap they form increases the overall area of the interface gap, resulting in proportionally reduced magnetic flux density crossing the gapped surface. Since the magnetic flux is directed in the direction normal to the gap surfaces, the axial component of the resulting total force is reduced by $\cos(\theta)$, where $\theta$ (theta) is the angle between the base of the isosceles trapezoid and each of its two equal length sides.

In general, the profiled sub-surfaces of the coupler need not be restricted to isosceles trapezoids. This choice is one convenient geometry among many possibilities.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure 1:
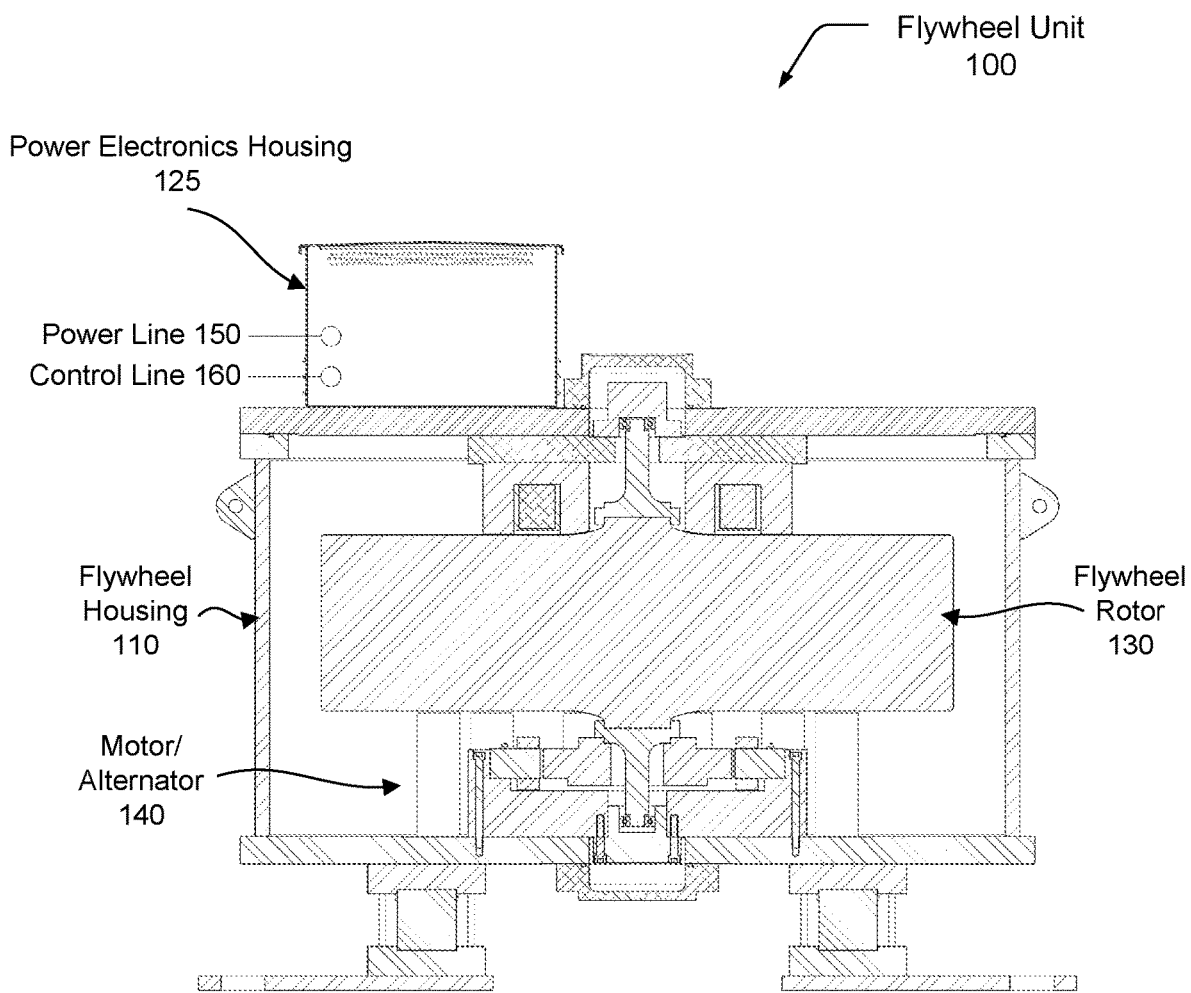
FIG. 1 is a simplified cross section view one embodiment of a flywheel energy storage system, also referred to as a flywheel unit.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Modern flywheel energy storage systems operate in a vacuum enclosure, in order to avoid frictional losses from residual gas drag. As such, it is preferred to integrate an electromagnetic motor/generator with the energy storage rotor within the vacuum enclosure, and to make the integration as seamless as possible. For example, it is preferred to avoid belts, pulleys, gears, long shafts, etc. Ideally, the rotor of the electromagnetic motor/generator is very tightly coupled to the flywheel rotor, avoiding the need for substantial additional mechanical coupling elements.

The integrated electromagnetic motor/generator described herein is operated with an electrical interface to accelerate or decelerate the energy storage rotor as required in any given energy storage application.

Some constraints on the type of motor/generators that are suitable for use in flywheel energy storage systems include avoiding contacting or sliding contacts associated with slip rings, brushes, and/or commutators, so as to avoid the lifecycle hazards associated with wear and tear, and the contamination of the vacuum environment. As such, the preferred machine types are AC machines that do not include such sliding contacts.

Another constraint is on the allowed power dissipation associated with the rotor. Power dissipated in the rotor can only be transferred to the housing via radiation, weak convection with the enclosed residual gas, or very limited conduction via mechanical bearings if present. As such, conventional ac induction machines have not generally been used in modern flywheel systems, due to their intrinsic rotor losses. Although conventional induction machines are sometimes considered for use in flywheel energy storage systems, an induction machine is usually not preferred due to its intrinsic rotor losses and relatively weaker rotor construction in relation to some of the above mentioned options. As noted above, rotor losses present a thermal management challenge for operation in vacuum environment.

A homopolar synchronous machine, also referred to as a homopolar machine, a homopolar motor, a homopolar motor and generator, motor and generator or simply a motor/generator, is a synchronous machine with a stationary field winding, in contrast to conventional synchronous machine types that have a rotating field winding and accompanying slip rings. As such, the homopolar machine avoids the need for slip rings, and the associated lifecycle and contamination hazard. Since the homopolar machine has operating characteristics analogous to a conventional synchronous machine, it has full capability of adjustment of field winding excitation and associated operating point. For example, to effect very low loss standby coasting, the field excitation can be de-energized, resulting in virtually zero electromagnetic losses. Homopolar synchronous machines are further advantageous because they are easily designed for negligibly low rotor losses.

Further, the field excitation can be adjusted at each operating speed, and for each operating power level, to optimize overall system efficiency. Losses due to conduction, electromagnetic core loss (e.g. iron loss), and power electronic conversion can be minimized in aggregate at each speed and power level. This level of adjustment is not readily available with a permanent magnet type machine, since the field intensity is not easily adjusted. A synchronous reluctance machine does permit field adjustment, but is typically constrained to a relatively low power factor.

Homopolar synchronous machines typically require three-dimensional flux paths. The field or dc bias magnetic flux is effected by the stationary field winding, which directs flux through gaps and solid, or non-solid, steel permeable magnetic pathways. The purpose is to magnetically energize the gap in between the active rotor lobes and the stator. Each of the active rotor lobes can be thought of as a North pole, with each of the valleys between these lobes thought of as a South pole. Since flux is unidirectional in this layout, the machine is termed homopolar. Without loss of generality, it should be noted that the flux path could be entirely reversed in response to an opposite field excitation. With application of the dc field excitation, the machine inherits the main features of a conventional synchronous machine.

Stator windings for this type of machine can be arranged with the conventional three-phase pattern with the appropriate pole count, with two poles per rotor lobe. The stator winding can be installed in slots with a conventional tooth-slot arrangement, or directly within the air-gap in a slotless arrangement.

The present invention includes embodiments of a homopolar synchronous machine, homopolar motor, or homopolar machine. The principal application of the homopolar motor described herein is for flywheel energy storage systems. However, the homopolar polar motor described herein is not so limited and can be used in other energy storage systems and other machines.

Flywheel Energy Storage System

FIG. 1 is a simplified cross section view of one embodiment of a flywheel energy storage system, also referred to as a flywheel unit 100 that mounts a power electronics subsystem, or power electronics unit 120 to a flywheel housing 110, according to one embodiment. Flywheel unit 100 includes a flywheel rotor assembly 130 or simply flywheel rotor 130, a motor and alternator 140, also referred to as motor/alternator 140 because both functions are typically performed by a single subsystem, a flywheel housing 110, a power electronics unit 120, a power line 150, which may be AC or DC, and a control line 160. For example, power line 150 may be a conventional three-phase 60 Hz AC line. Generally, hereinbelow, the term flywheel energy storage system, or flywheel unit refers to a single flywheel housing 110 and any rotors, motor/alternators and other elements that it houses as well as any power electronic elements, which may be housed and mounted on flywheel housing 110, as depicted in FIG. 1 or may be incorporated inside flywheel housing 110 or separately from flywheel unit 100.

In certain embodiments, power electronics unit 120 includes a power electronics housing 125 that encloses and houses electrical components including a power converter for converting the input alternating current into an alternating current acceptable to the motor/alternator 140. Alternatively, in other embodiments, power electronics unit 120 converts the alternating current from the motor/alternator 140 into a direct current output. Power electronics unit 120 may also include sensors, processors, memory, computer storage, and network adapters as necessary to perform communications, control and status monitoring of flywheel unit 100. Sensors may include multi-axis accelerometers, gyros, proximity sensors, temperature sensors, strain sensing elements and the like. Power electronics 120 receives and provides power via a power line 150 which may be AC or DC. In certain embodiments, power electronics 120 has a control line 120 for receiving and transmitting control signals. Control line 160 may be a physical cable such as an ethernet cable; alternatively it may communicate over a wireless communications link such as WIFI or BLUETOOTH.

Motor/alternator 140 converts between electrical and mechanical energy, so that energy can be stored in or drawn from the flywheel 130. Motor/alternator 140 combines the function of a motor and an alternator and thus may also be referred to as motor and alternator 140. Motor/alternator 140 couples to flywheel rotor 130 either directly, or indirectly, for example using a stub shaft that also connects to a supporting bearing. Motor/alternator 140 is coupled to power electronics unit 120 via wires or other electrical couplings that typically run through a vacuum feedthrough through the flywheel housing 110.

Although flywheel housing 110 is shown as enclosing a single flywheel rotor 130 and a single motor/alternator 140 in other embodiments a single housing may enclose multiple rotors and motor/alternators.

Integration of Flywheel Rotor with Motor/Alternator

Figure 2A:
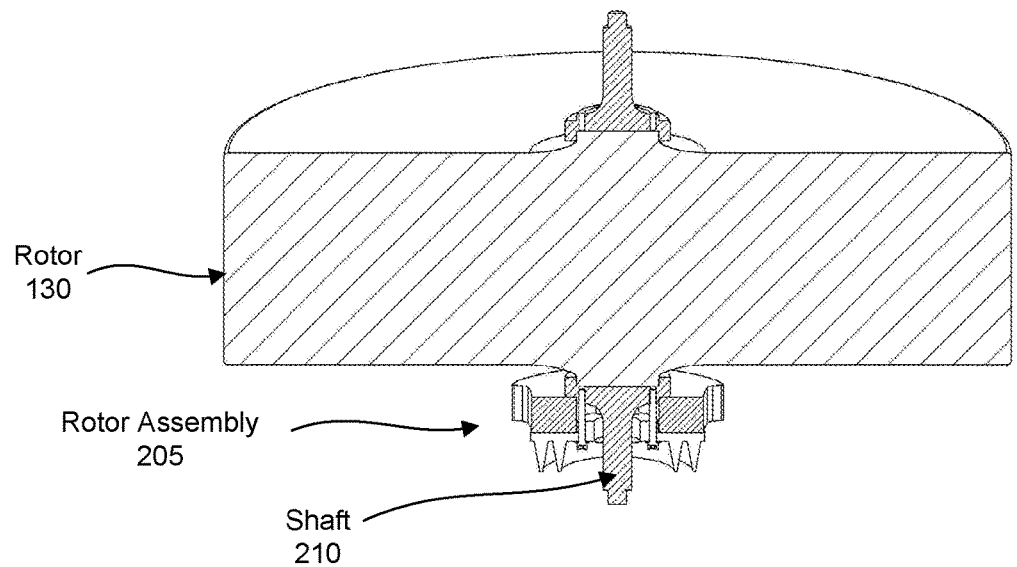
FIG. 2A shows the rotational elements of the embodiment of the flywheel unit of FIG. 1, including elements of an embodiment of a homopolar motor.
Figure 2B:
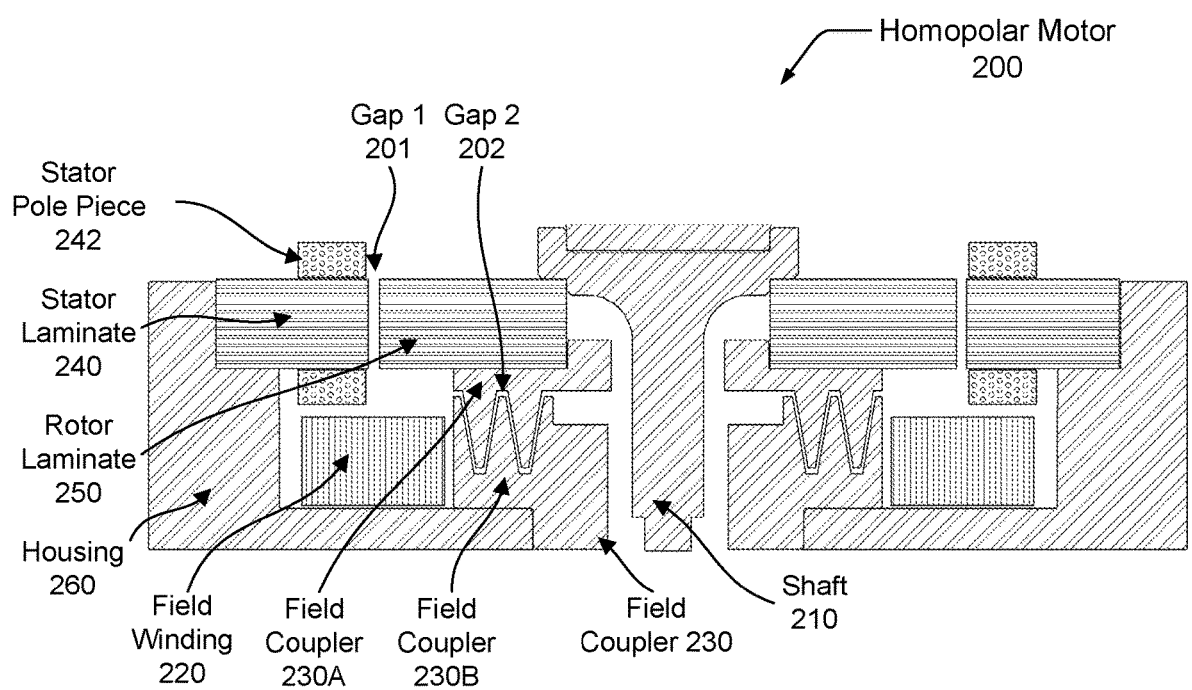
FIG. 2B shows a simplified cross section of one embodiment of a homopolar motor used to drive a flywheel unit.

FIG. 2A illustrates one embodiment of a mechanical coupling of a flywheel rotor 130, a shaft 210 and a rotor assembly 205 of a homopolar motor 200 (illustrated in FIG. 2B). Homopolar motor 200 is one embodiment of motor/alternator 140. In this arrangement, no additional bearings, shafts, gears, pulleys, etc., are required to couple the two rotors. In this embodiment, shaft 210 is shown as a stub shaft attached to rotor 130. In other embodiments, shaft 210 may emanate directly from rotor 130 or may be connected in other ways, rather than using a stub shaft configuration. Embodiments of a stub shaft that may be used in the subject invention are described in U.S. Patent Application No. 2016/0061289, filed on Jul. 28, 2015, which is incorporated in its entirety by reference herein. In certain embodiments, homopolar motor 200 couples directly to a flywheel rotor. In such embodiments, a shaft is not required to couple the flywheel rotor 130 with the rotor assembly 205.

FIG. 2B shows a simplified cross section of one embodiment of homopolar motor 200. Homopolar motor 200 applies torque to shaft 210, which is shown as a stub shaft.

Homopolar motor includes a stator that includes a stator laminate stack 240 and a number of stator pole pieces 242, referred to henceforth as pole pieces 242. Pole pieces 242 guide (or direct) flux across a first, or principle, radial gap 1 to rotor assembly 205 to generate torque. Rotor assembly 205 is coupled to and rotates with shaft 210 which in turn rotates flywheel rotor 130. Rotor assembly 205 includes a rotor laminate stack 250 and a top portion of a field coupler 230, referred to as field coupler 230A. A bottom portion of field coupler 230, referred to as field coupler 230B attaches to a housing 260 and remains stationary. Rotor laminate stack 250, also referred to as rotor laminate 250, is formed of a stack of identical steel laminations that serve to block AC eddy currents. Alternatively, rotor laminate 250 may be formed of solid steel.

Homopolar motor 200 further includes a field winding 220 that generates magnetic flux across the gaps, collectively referred to as gap 2, between the two interleaved portions of field coupler 230, namely the top portion of field coupler 230A, which rotates with shaft 210 and the bottom portion of field coupler 230B which remains stationary. Field coupler 230 provides a path for magnetic flux generated by field winding 220 from its stationary part 230A to its rotating part 230B.

In certain embodiments, field winding 220 is formed by a coil of insulated or anodized, thin, aluminum or copper. This provides a low resistance electrical conductor.

Homopolar motor 200 along with flywheel rotor 130 are easily assembled by lowering the assembled rotor assembly 205, comprising flywheel rotor 130 shaft 210, rotor laminate 250, and top portion of field coupler 230A into flywheel housing 110 without any impediment. Field coupler 230 and gaps 1 and 2 do not impede or in any way interfere with this simple assembly step. No assembly steps in the rotating group are required after the flywheel rotor is inserted into the flywheel housing.

P-Pole Design

Figure 3A:
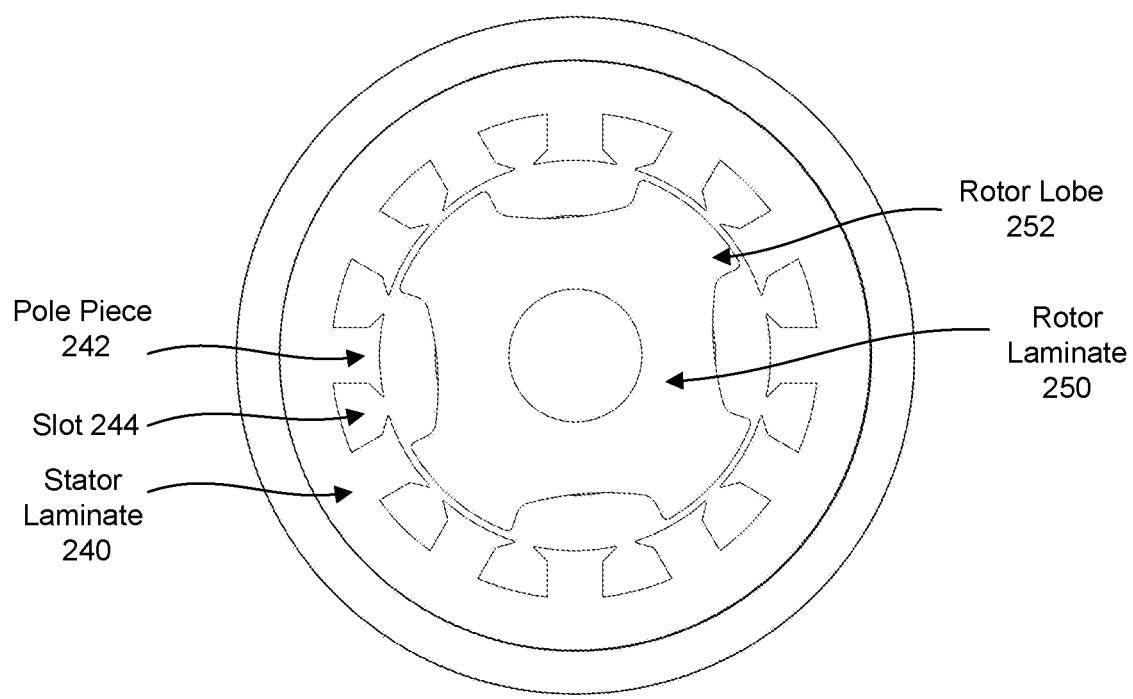
FIG. 3A illustrates an embodiment of a polar configuration of the rotor and stator of the homopolar motor.
Figure 3B:
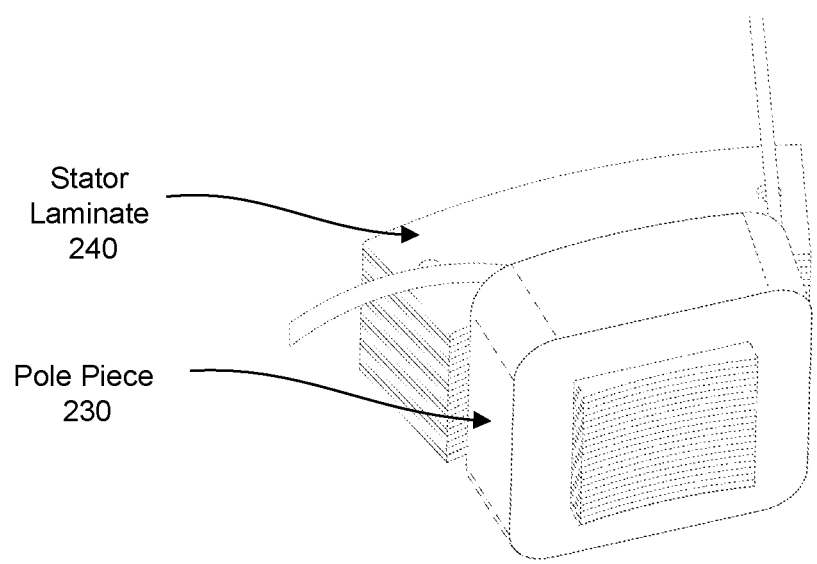
FIG. 3B illustrates an embodiment of a pole piece from the stator of the homopolar motor.

FIG. 3A-B illustrate an embodiment of a p-pole design for the rotor and stator elements of homopolar motor 200.

FIG. 3A illustrates an embodiment of a rotor with 4 lobes and 8 poles and a corresponding stator with 12 teeth and 12 slots. In homopolar motor 200, each tooth is implemented as a pole piece 242 and a slot 244 is formed by the space between two adjacent pole pieces 242. Each pole piece 242 comprises a sector of stator 240. Each pole piece 242 is formed by installing a winding, or coil, around a laminate sector of the stator.

The configuration of FIG. 3A is a p-pole design with a 3/2 relationship between the number of slots, or teeth, on the stator and the number of poles on the rotor, i.e. the number of slots=3/2*p where p is the number of poles. Each tooth has a stator coil, and effectively spans ⅔ of a rotor pole, providing a strong fundamental flux linkage function, but while requiring a very minimal conductor endturn length. Further, since the individual coils are non-overlapping, the windings are very easy to manufacture either in-situ or on individual stand-alone tooth sections.

There are several possible choices of the number of slots, and hence pole pieces, and poles, p. Some simple rules must be observed: (1) the number of slots, and hence pole pieces, must be a multiple of 3 to accommodate 3 phase power generation in a balanced way; (2) good choices often have p close to, but not equal to, the number of slots; and p is an even integer since poles are in pairs. While the configuration illustrated in FIG. 3A has 12 slots and 8 poles, the 3/2 ratio is not a requirement. For example, other effective choices include 12 slots and 10 poles, and 12 slots and 14 poles.

FIG. 3B illustrates an embodiment of one stator pole piece 242 from the stator of homopolar motor 200. Pole piece 242 directs magnetic flux across gap 1 to the rotor, which includes rotor laminate 250 and rotor lobes 252. This arrangement optimizes the use of the stator conductor with respect to cost and efficiency. Specifically, the winding configuration has relatively short endturns in relation to conventional multi-slot windings. This is important for an implementation with a short stack length. And, further, the non-overlapping windings simplify manufacture, and, again reduce endturn length.

It may be appreciated that an alternative arrangement is to use a single integral stator laminate, and to install windings on each tooth, to manufacture the stator.

Path of DC Field Magnetic Flux

Figure 4A:
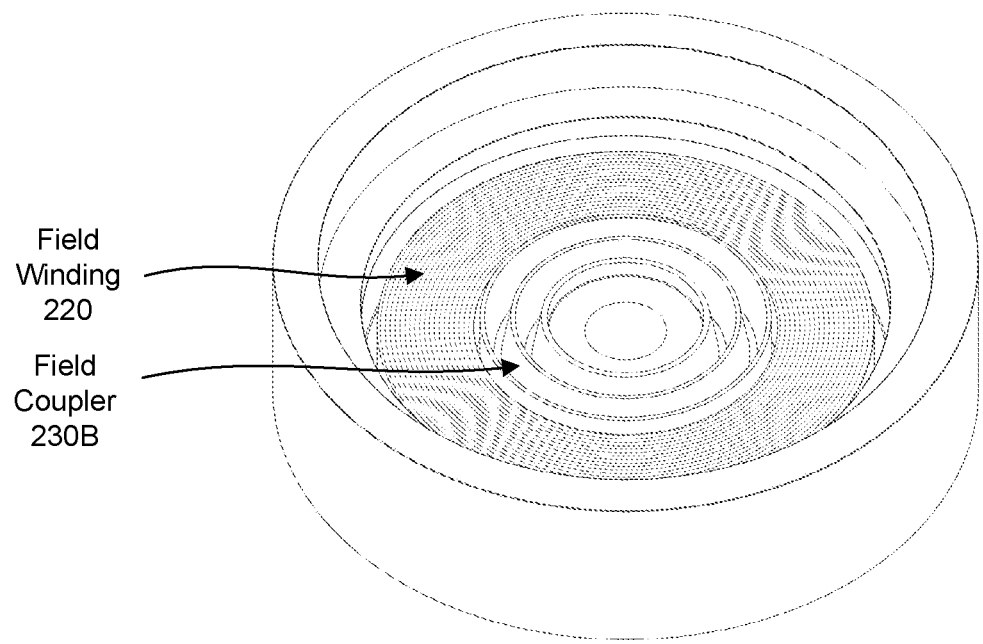
FIG. 4A is an isometric view of an embodiment of a field winding and a non-rotating portion of a field coupler of the homopolar motor.
Figure 4B:
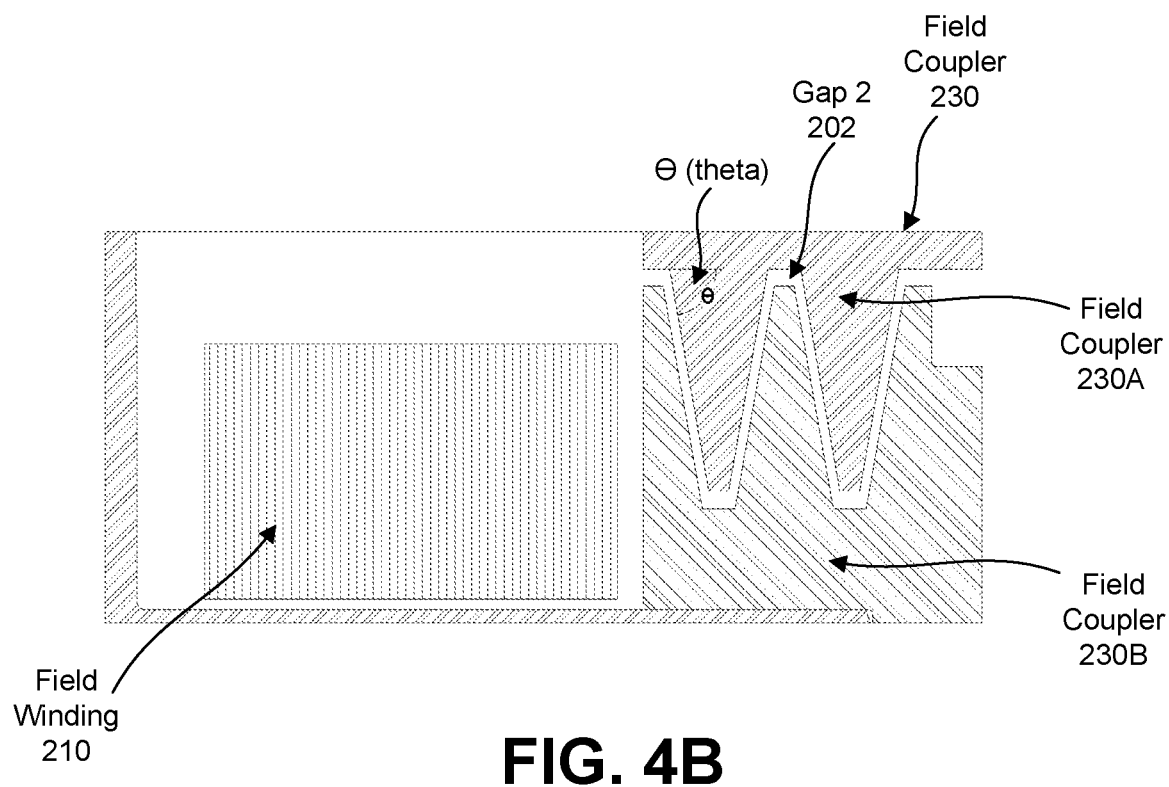
FIG. 4B is a cross section view of an embodiment of a field winding and a non-rotating portion of a field coupler of the homopolar motor.

FIGS. 4A-4B illustrate an embodiment of field coupler 230, which forms an auxiliary coupler gap 2, in order to energize the principle active rotor-stator gap 1. Gap 2 presents several problems since it is potentially associated with intense flux density, substantial MMF drop, magnetic force, and associated negative magnetic stiffness. One embodiment of an auxiliary coupler that is used to energize the principle rotor gap 1, shown in FIGS. 4A-4B, and referred to as field coupler 230, substantially solves these problems.

FIG. 4A is an isometric view of an embodiment of field winding 220 and the bottom, non-rotating, portion of field coupler 230, referred to as field coupler 230B.

FIG. 4B is a cross section view of an embodiment of a field winding and field coupler 230A, the lower, non-rotating portion of a field coupler 230, and field coupler 230B the top, or upper, rotating portion of field coupler 230. As illustrated, field coupler 230 has two interleaved portions: top field coupler 230A and bottom field coupler 23B. The cross-section of top field coupler 230A appears as one, two, or more successive isosceles trapezoids that narrow from top to bottom; these can also be viewed as isosceles triangles with flattened tips. The cross section of bottom field coupler 230B is inverted from that of top field coupler 230B, i.e. it appears as one, two, or more successive isosceles trapezoids of the same size, which narrow from bottom to top. Further, in certain embodiments the gap between the surfaces of top field coupler 230A and bottom field coupler 230B, gap 2, is of uniform distance.

While the illustrated cross section of field coupler 230 is depicted as two interleaved isosceles trapezoids on the top and bottom in certain embodiments one trapezoid or more than two trapezoids may be used. Further, in certain embodiments the trapezoids may not be isosceles. Yet further, geometric shapes other than trapezoids may be used, such as triangles, rectangles or other quadrilaterals; the general requirement being an interlocking pattern between the cross-section shape of top field coupler 230A and bottom field coupler 230B.

Field coupler 230 directs flux to travel normal to its sloped surfaces. This approach increases the overall area of gap 2, resulting in proportionally reduced magnetic flux density crossing the gapped surface. This mitigates problems with magnetic saturation, and with attractive magnetic forces normal to the interfacing surfaces. In this embodiment, the overall magnetic flux intensity at gap 2 is reduced by $\cos(\theta)$ where $\theta$ is the angle the field coupler 230 internal surfaces makes with the horizontal, i.e. angle between the base of an isosceles triangle and each of its two equal length sides, as depicted in FIG. 4B. Next, since the magnetic flux is directed in the direction normal to the surfaces of gap 2, the axial component of the resulting total force is reduced by $\cos(\theta)$. It may be appreciated that large and variable axial forces present a challenge for the flywheel bearing and suspension system. With this arrangement, field coupler gap flux density is reduced by $\cos(\theta)$, resulting in a reduction of the attractive force density (magnetic stress) normal to the surface by $\cos^2(\theta)$. Since the force is directed obliquely to the principle axial direction, it is further reduced by $\cos(\theta)$. Thus, field coupler 230 surface surface area is increased by $1/\cos(\theta)$, and net axial force is reduced by $\cos^2(\theta)$, which substantially reduces the chances of magnetic saturation.

In a most preferred embodiment the angle $\theta$ is between 75 and 85 degrees. In other embodiments, angles between 30 and 90 degrees may be used.

Additional Configuration Considerations

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A homopolar motor, comprising:
a housing;
a rotor, attached to a shaft of the motor, which rotates with the shaft around a vertical axis;
a stator, encircling the rotor, comprising a plurality of pole pieces, wherein the space between each pole piece and the rotor forms a first, radial, air gap;
a stationary field winding, attached to the housing, which generates magnetic flux that magnetically energizes the first air gap; and
a field coupler comprising an interleaved top portion and a bottom portion, wherein the top portion is attached to and rotates with the rotor, and the bottom portion, attaches to the housing and is stationary, wherein the space between the interleaved top portion and the bottom portion of the field coupler forms a second, axial, air gap, and wherein the cross section of the interleaved top portion is at least one downward pointing trapezoid that narrows from top to bottom and the cross section of the interleaved bottom portion is at least one upward pointing trapezoid that narrows from bottom to top, and wherein each of the trapezoids are isosceles trapezoids with an angle, $\theta$, between the base of the base of the trapezoids and each of its two equal length sides, wherein $\theta$ is substantially between 75 degrees and 85 degrees, thereby increasing the surface area of the second air gap and proportionately reducing the magnetic flux density across the second air gap.

2. The homopolar motor of claim 1 wherein there at least two successive trapezoids on both the top portion and the bottom portion.

3. The homopolar motor of claim 1 wherein the field coupler axial air gap flux density is reduced by $\cos(\theta)$.

4. The homopolar motor of claim 1 wherein the field winding is made of aluminum or copper.

5. The homopolar motor of claim 1 wherein the field winding is made of insulated aluminum or copper.

6. The homopolar motor of claim 1 further comprising a rotor assembly that attaches to the shaft and rotates with the shaft, comprising: a flywheel rotor, attached to the shaft, the rotor of the motor, and the top portion of the field coupler.

7. The homopolar motor of claim 6 wherein the rotor assembly is configured to lower directly into the housing and couple with an assembled stator assembly, the stator assembly comprising a stator laminate, the plurality of pole pieces, the field winding, and the bottom portion of the field coupler.

8. The homopolar motor of claim 1 further comprising a rotor assembly that couples directly to a flywheel rotor and rotates with the flywheel rotor, comprising: the flywheel rotor, the rotor of the motor, and the top portion of the field coupler.

* * * * *